United States Patent
Bronson et al.

(10) Patent No.: US 9,897,320 B2
(45) Date of Patent: Feb. 20, 2018

(54) EFFUSION COOLED DUAL WALL GAS TURBINE COMBUSTORS

(75) Inventors: Thomas J. Bronson, Mesa, AZ (US); Frank Joseph Zupanc, Phoenix, AZ (US); Paul Yankowich, Phoenix, AZ (US); Nagaraja Rudrapatna, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2557 days.

(21) Appl. No.: 12/512,816

(22) Filed: Jul. 30, 2009

(65) Prior Publication Data

US 2011/0023495 A1 Feb. 3, 2011

(51) Int. Cl.
*F23R 3/06* (2006.01)

(52) U.S. Cl.
CPC ...... *F23R 3/06* (2013.01); *F23R 2900/03041* (2013.01); *F23R 2900/03044* (2013.01); *Y02T 50/675* (2013.01)

(58) Field of Classification Search
CPC ...... F23R 3/04; F23R 3/06; F23R 3/08; F23R 3/10
USPC ................................. 60/752–760
See application file for complete search history.

(56) References Cited

U.S. PATENT DOCUMENTS

| 4,380,905 | A | 4/1983 | Smart et al. | |
|---|---|---|---|---|
| 5,000,005 | A | 3/1991 | Kwan et al. | |
| 5,396,759 | A | 3/1995 | Richardson | |
| 5,918,467 | A | 7/1999 | Kwan | |
| 6,408,629 | B1 | 6/2002 | Harris et al. | |
| 6,708,499 | B2 | 3/2004 | Pidcock et al. | |
| 7,093,439 | B2 | 8/2006 | Pacheco-Tougas et al. | |
| 7,506,512 | B2 | 3/2009 | Schumacher et al. | |
| 7,509,809 | B2 | 3/2009 | Patel et al. | |
| 7,546,737 | B2 * | 6/2009 | Schumacher et al. | 60/754 |
| 8,161,752 | B2 * | 4/2012 | Yankowich et al. | 60/752 |
| 2003/0167772 | A1 | 9/2003 | Farmer et al. | |
| 2003/0213250 | A1 * | 11/2003 | Pacheco-Tougas et al. | 60/752 |
| 2006/0037323 | A1 | 2/2006 | Reynolds et al. | |
| 2007/0130953 | A1 * | 6/2007 | Burd et al. | 60/772 |

(Continued)

FOREIGN PATENT DOCUMENTS

EP 2083220 A2 7/2009

OTHER PUBLICATIONS

EP Extended EP Search Report for Application 10170528.3-1605/2280225 dated Oct. 18, 2017.

*Primary Examiner* — Craig Kim
(74) *Attorney, Agent, or Firm* — Lorenz & Kopf, LLP (57) ABSTRACT

A gas turbine engine combustor is provided. An inner liner has an upstream end and a downstream end and extends in an axial direction between the upstream and downstream ends. A dual wall outer liner has a hot wall, a cold wall at least partially surrounding the hot wall, an upstream end, and a downstream end. The outer liner extends in the axial direction between the upstream and downstream ends. A dome assembly is coupled between the upstream ends of the inner and outer liners to define a combustion chamber between the inner liner and the hot wall of the outer liner. Effusion cooling holes are disposed in the hot wall, including a first row disposed at a tangential angle of between about 70° and about 90° and a second row disposed at a tangential angle of between about 0° and about 20°.

20 Claims, 5 Drawing Sheets

(56) References Cited

U.S. PATENT DOCUMENTS

| | | | |
|---|---|---|---|
| 2007/0144178 A1* | 6/2007 | Burd et al. .................... | 60/753 |
| 2007/0169484 A1 | 7/2007 | Schumacher et al. | |
| 2007/0227149 A1* | 10/2007 | Biebel et al. ................. | 60/752 |
| 2009/0071161 A1 | 3/2009 | Critchley et al. | |
| 2009/0084110 A1 | 4/2009 | Dudebout et al. | |

* cited by examiner

EFFUSION COOLED DUAL WALL GAS TURBINE COMBUSTORS

TECHNICAL FIELD

The present invention relates to gas turbine engines, and more particularly, to dual wall, gas turbine engine combustors.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the inlet section of the engine and includes a fan that induces air from the surrounding environment into the engine and accelerates a portion of this air toward the compressor section. The remaining portion of air induced into the fan section is accelerated into and through a bypass plenum and out the exhaust section.

The compressor section raises the pressure of the air received from the fan section. The compressed air from the compressor section then enters a combustion chamber of the combustor section, where a ring of fuel nozzles injects a steady stream of fuel. The fuel and air mixture is ignited to form combustion gases from which energy is extracted in the turbine section.

Known combustors include inner and outer liners that define the annular combustion chamber. The combustors in gas turbine engines typically operate at relatively high temperatures, including temperatures over 3500° F. Such high temperatures can adversely impact the service life of a combustor. Thus, some form of cooling is typically provided for the combustor. One example of combustor cooling is known as effusion cooling. Effusion cooling involves a matrix of relatively small diameter effusion cooling holes extending through the combustor liners to admit a flow of cooling air. The effusion cooling holes are typically angled relative to a surface of the combustor to generate a cooling film on the inner wall of the liners. This angle also increases the length of the effusion holes through the liners, which increases the surface area from which the cooling flow removes heat from the liner.

Although effusion cooling is generally effective, it does suffer certain drawbacks. For example, one characteristic of effusion cooling is that the film effectiveness may be relatively low at or near upstream sections of the combustor liner. Moreover, the cooling film, once it is sufficiently established, may be interrupted by one or more rows of major combustor orifices, such as dilution holes. As a result, some form of cooling augmentation may be used in the upstream sections of effusion cooled combustor liners and/or at locations downstream of major combustor orifices. Such cooling augmentation can complicate the construction of combustor and increase overall size, weight, and/or costs.

Accordingly, it is desirable to provide for an effusion cooling configuration that exhibits improved film effectiveness at all sections of the combustor. In addition, it is desirable to provide a configuration that does not require one or more forms of cooling augmentation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a gas turbine engine combustor is provided. An inner liner has an upstream end and a downstream end and extends in an axial direction between the upstream and downstream ends. A dual wall outer liner has a hot wall, a cold wall at least partially surrounding the hot wall, an upstream end, and a downstream end. The outer liner extends in the axial direction between the upstream and downstream ends. The outer liner is spaced apart from, and at least partially surrounding, the inner liner. A dome assembly is coupled between the upstream ends of the inner and outer liners to define a combustion chamber between the inner liner and the hot wall of the outer liner. A plurality of rows of effusion cooling holes are disposed in the hot wall, including a first row of effusion cooling holes disposed at a tangential angle of between about 70° and about 90° relative to the axial direction and a second row of effusion cooling holes disposed at a tangential angle of between about 0° and about 20° relative to the axial direction.

In accordance with another exemplary embodiment, a combustor liner segment includes a hot side; a cold side opposing the hot side and having an upstream end and a downstream end, the cold side extending in an axial direction between the upstream and downstream ends; and a plurality of effusion cooling holes extending from the cold side to the hot side, including a first row of effusion cooling holes disposed at a tangential angle of between about 70° and about 90° relative to the axial direction and a second row of effusion cooling holes disposed at a tangential angle of between about 0° and about 20° relative to the axial direction.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments disclosed herein provide dual wall combustors with liners having hot and cold walls. The hot wall may include an upstream row of effusion cooling holes disposed in a tangential direction and a downstream row of effusion cooling holes disposed in an axial direction. Downstream of dilution openings, the hot wall may have another row with effusion cooling holes disposed in the tangential direction. The combustor may further have impingement cooling holes in the cold wall of the dual wall liner.

Figure 1:
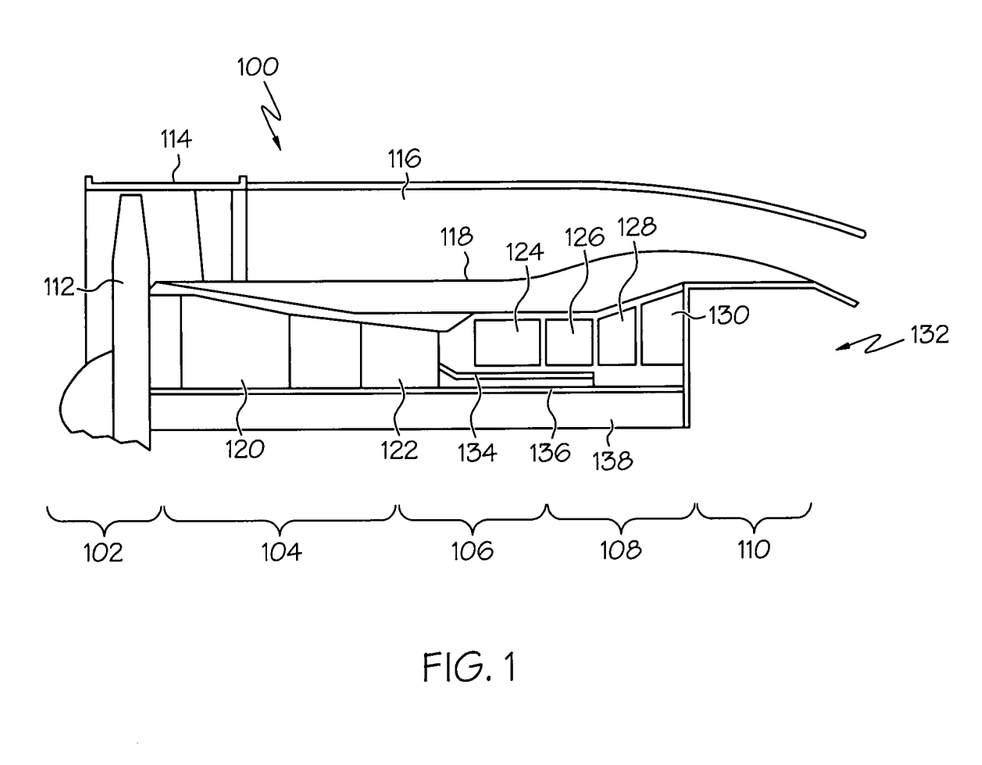
FIG. 1 is a simplified cross-sectional side view of an exemplary multi-spool turbofan gas turbine jet engine according to an exemplary embodiment.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws in and accelerates air into the intake section 102. A fraction of the accelerated air exhausted from the fan 112 is directed through a bypass section 116 disposed between the fan case 114 and an engine cowl 118. The remaining fraction of air exhausted from the fan 112 is directed into the compressor section 104.

The compressor section 104 includes an intermediate pressure compressor 120 and a high pressure compressor 122. The intermediate pressure compressor 120 raises the pressure of the air from the fan 112 and directs the compressed air into the high pressure compressor 122. The high pressure compressor 122 compresses the air further and directs the high pressure air into the combustion section 106. In the combustion section 106, the high pressure air is mixed with fuel and combusted in a combustor 124. The combusted air is then directed into the turbine section 108.

The turbine section 108 may have three turbines disposed in axial flow series, including a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138. The air is then exhausted through a propulsion nozzle 132 disposed in the exhaust section 110.

Figure 2:
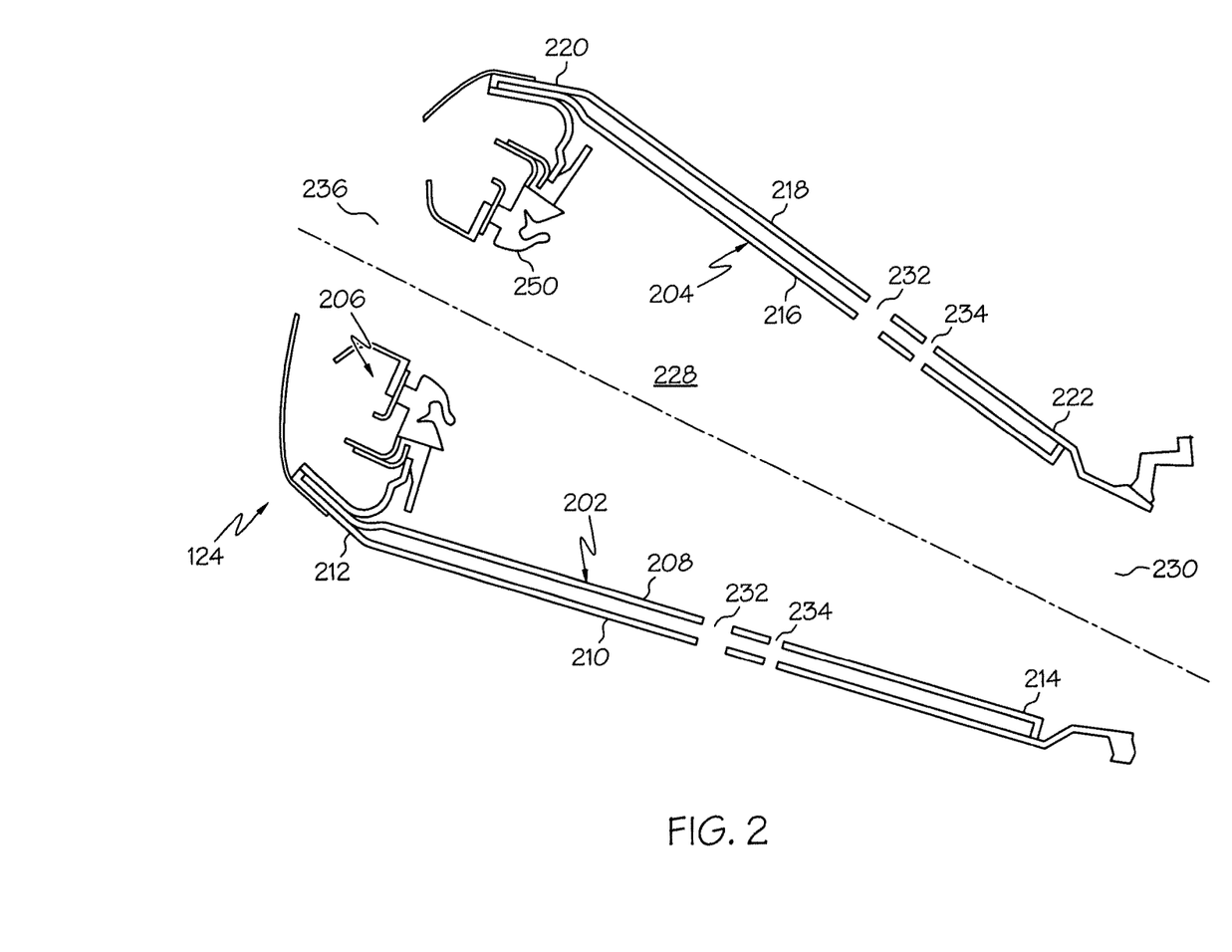
FIG. 2 is a cross-sectional view of an exemplary combustor that may be used in the engine of FIG. 1.

Turning now to FIG. 2, the combustor 124, which in the depicted embodiment is implemented as an annular combustor, includes an inner liner 202, an outer liner 204, and a dome 206. The inner liner 202 is a dual wall liner with a hot wall 208 and a cold wall 210 with upstream and downstream ends 212, 214. The outer liner 204, which at least partially surrounds the inner liner 202, is also a dual wall liner that includes a hot wall 216 and a cold wall 218 with upstream and downstream ends 220, 222. The dome 206 is coupled between the upstream ends 212, 220 of the inner and outer liners 202, 204 to form a combustion chamber 228 therebetween. The downstream ends 214, 222 of the inner and outer liners 202, 204 form an opening 230 through which combusted air flows into the turbine section 108 (FIG. 1).

The inner and outer liners 202, 204 may each include at least one circumferential row of dilution openings 232, 234. The dilution openings 232, 234 generally admit additional air into the combustion chamber 228 to establish combustor aerodynamics and cool the exhaust gases to acceptable levels before entering the turbine section 108 (FIG. 1). In the depicted embodiment, two rows of dilution openings 232, 234 are provided, including primary dilution openings 232 and secondary dilution openings 234.

The dome 206 also includes a number of circumferentially spaced, axially facing swirler assembly openings 236. Each of the swirler assembly openings 236 is configured to have mounted therein a swirler assembly 250. The swirler assemblies mix fuel and air, and the fuel/air mixture is then discharged into the combustion chamber 228 where it is ignited by one or more igniters (not shown).

As will be discussed in greater detail below in the description of FIGS. 3-6, in addition to the dilution openings 232, 234, the inner and outer liners 202, 204 include a plurality of impingement cooling holes and a plurality of effusion cooling holes. The impingement cooling holes are arranged in the cold walls 210, 218 of the inner and outer liner 202, 204, and the effusion cooling holes are arranged in the hot walls 208, 216 of the inner and outer liners 202, 204. The impingement cooling holes allow cooling air to flow through the cold walls 210, 218 to the hot walls 208, 216. The effusion cooling holes enable air flow to cool the hot walls 208, 216 via convective heat transfer and by generating a cooling film on the inner surfaces of the inner and outer liners 202, 204. A more detailed description of the configuration of the impingement cooling holes and effusion cooling holes will now be provided.

Figure 3:
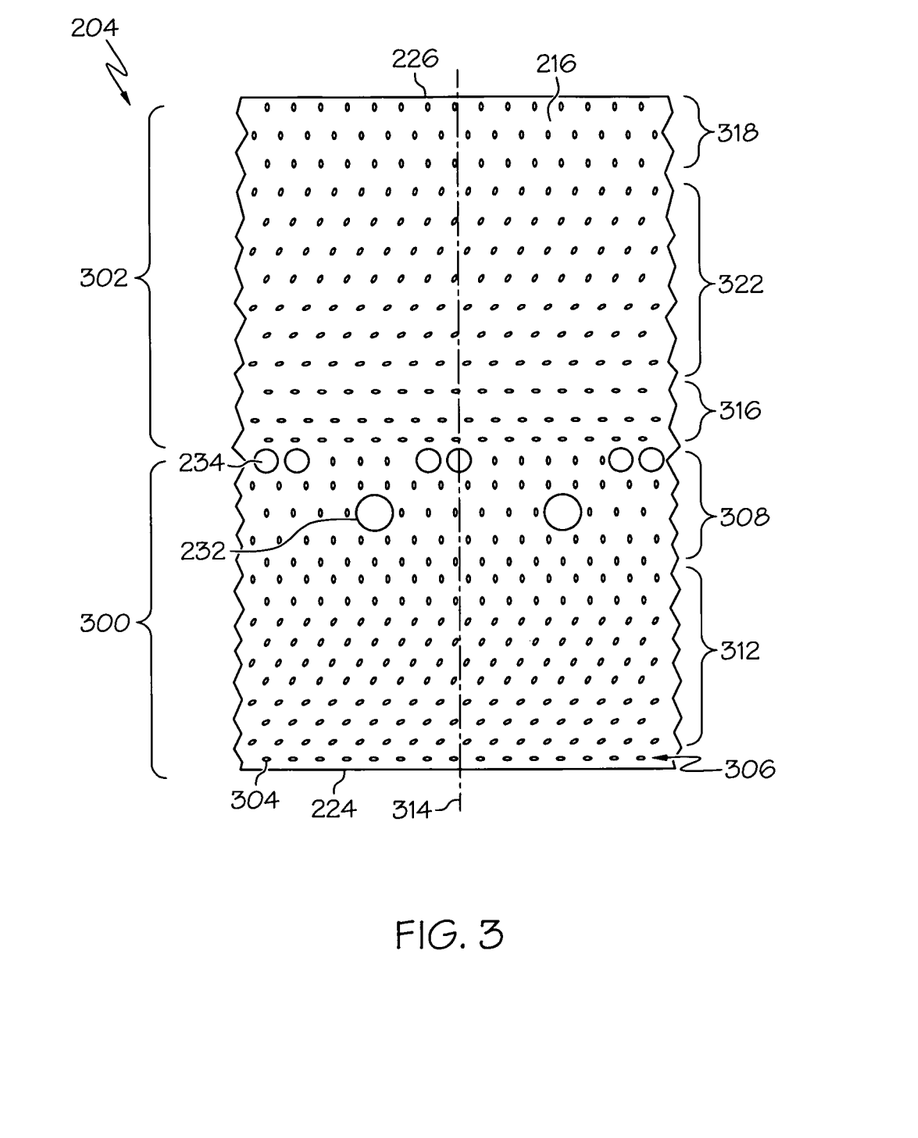
FIG. 3 is a plan view of a portion of a combustor liner according to an exemplary embodiment that may be used in the combustor shown in FIG. 2.
Figure 4:
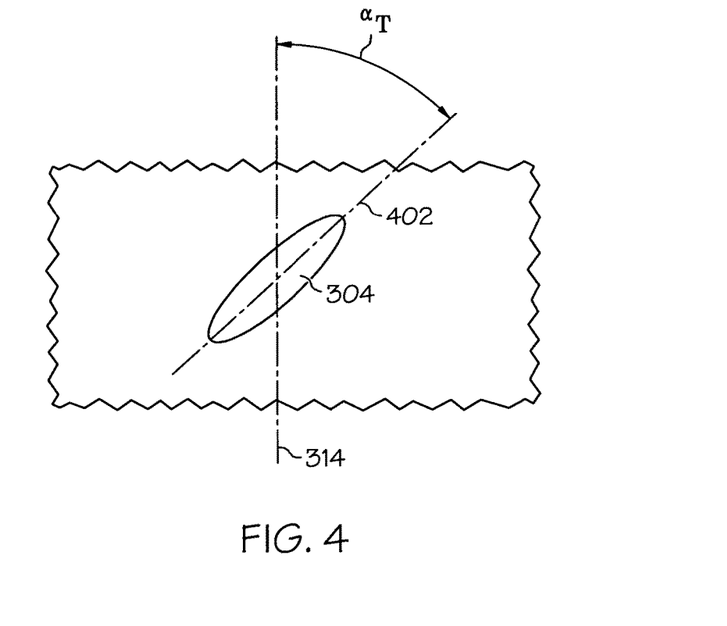
FIG. 4 is a close-up view of the exemplary combustor liner shown in FIG. 3, depicting the configuration of an exemplary effusion cooling hole that extends therethrough.

FIG. 3 is a plan view of a portion the outer liner 204. In particular, the plan view of FIG. 3 shows the hot wall 216 of the outer liner 204 between the upstream and downstream ends 224, 226. The hot wall 216 of the outer liner 204 includes a number of effusion cooling holes 304 that may be considered to be arranged in upstream and downstream sets 300, 302. It will be appreciated that the number of effusion cooling hole sets 300, 302 may vary, and may be selected to meet needed or desired cooling requirements. However, in the depicted exemplary embodiment, the upstream effusion cooling hole set 300 is disposed upstream of, or circumferentially aligned with, major combustor orifices, such as the dilution openings 232, 234, and the downstream effusion cooling hole set 302 is disposed downstream of, or circumferentially aligned with, the major combustor orifices. Thus, in the depicted embodiment, the upstream effusion cooling hole set 300 is upstream of and at least partially aligned with the dilution openings 232, 234 and the downstream effusion cooling hole set 302 is downstream of the dilution openings 232, 234. It will be appreciated, however, that this is merely exemplary of the depicted embodiment, and that the outer liner 204 could be implemented with more than two effusion cooling hole sets 300, 302 if needed or desired. Moreover, it is noted that although the outer liner 204 is depicted in FIG. 3, it will be appreciated that the inner liner 202 is typically configured to include similarly arranged effusion cooling holes sets.

Each effusion cooling hole set 300, 302 includes a number of effusion cooling holes 304 that extend through the hot wall 216 of the outer liner 204. The effusion cooling holes 304 in each effusion cooling hole set 300, 302 typically have a diameter of between about 0.01 inches and about 0.03 inches and are configured in a number of rows. In particular, each effusion cooling hole set 300, 302 includes one or more initial rows 306, 316 of effusion cooling holes 304, one or more final rows 308, 318 of effusion cooling holes 304 disposed downstream of the one or more initial rows 306, 316, and a number of interposed rows 312, 322 of effusion cooling holes 304 disposed between the initial rows 306, 316 and final rows 308, 318. The initial rows 306, 316 are disposed at the upstream-most extent of each effusion cooling hole set 300, 302, and the final rows 308, 318 are concomitantly disposed at the downstream-most extent of each effusion cooling hole set 300, 302. The total number of rows 306, 316, 308, 318, 312, 322 in an effusion cooling hole set 300, 302 may vary, and the number of initial rows 306, 316, final rows 308, 318, and interposed rows 312, 322 within an effusion cooling hole set 300, 302 may vary.

No matter the specific row that an effusion cooling hole 304 is in, each hole 304 is disposed at a tangential angle ($\alpha_T$) relative to an axial line 314 that extends between the outer liner upstream and downstream ends 224, 226. More specifically, and as shown more clearly in FIG. 4, each effusion cooling hole 304 is disposed such that a centerline 402 thereof forms an angle ($\alpha_T$) relative to the axial line 314.

Returning now to FIG. 3, it is seen that the tangential angle ($\alpha_T$) of the effusion cooling holes 304 in each set 300, 302 gradually transitions from a substantially transverse tangential angle ($\alpha_T$) in each initial row 306, 316 to a substantially axial tangential angle ($\alpha_T$) in each final row 308, 318. More specifically, each effusion cooling hole 304 in an initial row 306, 316 is typically disposed at a tangential angle ($\alpha_T$) of between about 70° and about 90°, particularly at about 90°, and each effusion cooling hole 304 in a final row 308, 318 is typically disposed at a tangential angle ($\alpha_T$) of between about 0° and about 20°, particularly at about 0°. The effusion cooling holes 304 in each of the interposed rows 312, 322 are typically disposed at a tangential angle ($\alpha_T$) that is less than the tangential angle ($\alpha_T$) of the effusion cooling holes 304 in each initial row 306, 316 and greater than the tangential angle ($\alpha_T$) of the effusion cooling holes 304 in each final row 308, 318. Generally, the tangential angle ($\alpha_T$) of the effusion cooling holes 304 in each of the interposed rows 312, 322 has a multiplicity of values that vary in a graduated manner as the rows 312, 322 progress downstream.

Figure 5:
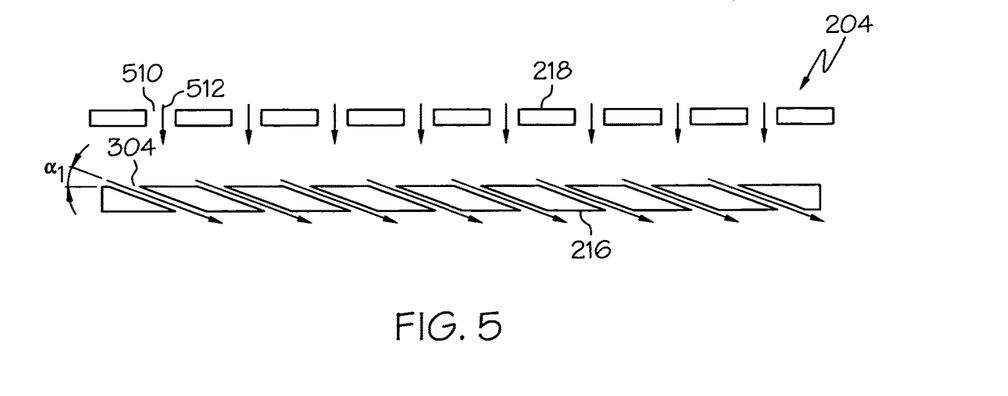
FIG. 5 is a cross section view of a portion of the exemplary combustor liner shown in FIG. 3.

In addition to being disposed at a tangential angle ($\alpha_T$), it will be appreciated that the effusion cooling holes 304 are also preferably disposed at an inward angle ($\alpha_I$). More specifically, and as shown more clearly in FIG. 5, each effusion cooling hole 304 extends through the liners 202, 204 at an acute angle relative to the liner outer surface. Although the inward angle ($\alpha_I$) may vary, in a particular exemplary embodiment, the inward angle ($\alpha_I$) is between about 10° and about 30°. As noted above, the outer liner 204 is a dual wall liner, and particularly is a dual wall liner with impingement-effusion cooling. As such, the cold wall 218 includes a number of impingement cooling holes 510 that admit impingement jets 512 of cooling air to the hot wall 216. The impingement cooling holes 510 are typically 90° to the surface of the cold wall 218, although other arrangements are possible. The effusion cooling holes 304 of the hot wall 216 are relatively small, closely spaced holes serving to direct a flow of cooling air through the hot wall 216 such that a film of cooling air forms on the hot wall 216, as discussed in greater detail below. Also, although a portion of the outer liner 204 is shown in FIG. 5, the inner liner 202 is similarly configured to be cooled with impingement-effusion cooling.

With the effusion cooling hole 304 configuration described herein, the substantially transversely disposed effusion cooling holes 304 in each of the initial rows 306, 316 serve to establish a cooling film on the liner inner surfaces. The transition of the effusion cooling holes 304 from the substantially transverse tangential angle ($\alpha_T$) to the substantially axial tangential angle ($\alpha_T$) encourages cooling air flow in the downstream direction, which provides continued effective cooling of the liner inner surfaces while mitigating the swirl component of the upstream effusion cooling holes 304. Moreover, because another effusion cooling hole set 302 is disposed downstream of each circumferential row of major combustor orifices, such as the dilution openings 232, 234, the repeated transition from a substantially transverse tangential angle ($\alpha_T$) to a substantially axial tangential angle ($\alpha_T$) maintains the cooling film downstream of these major combustor orifices, and helps increase overall combustor 124 cooling efficiency.

Figure 6:
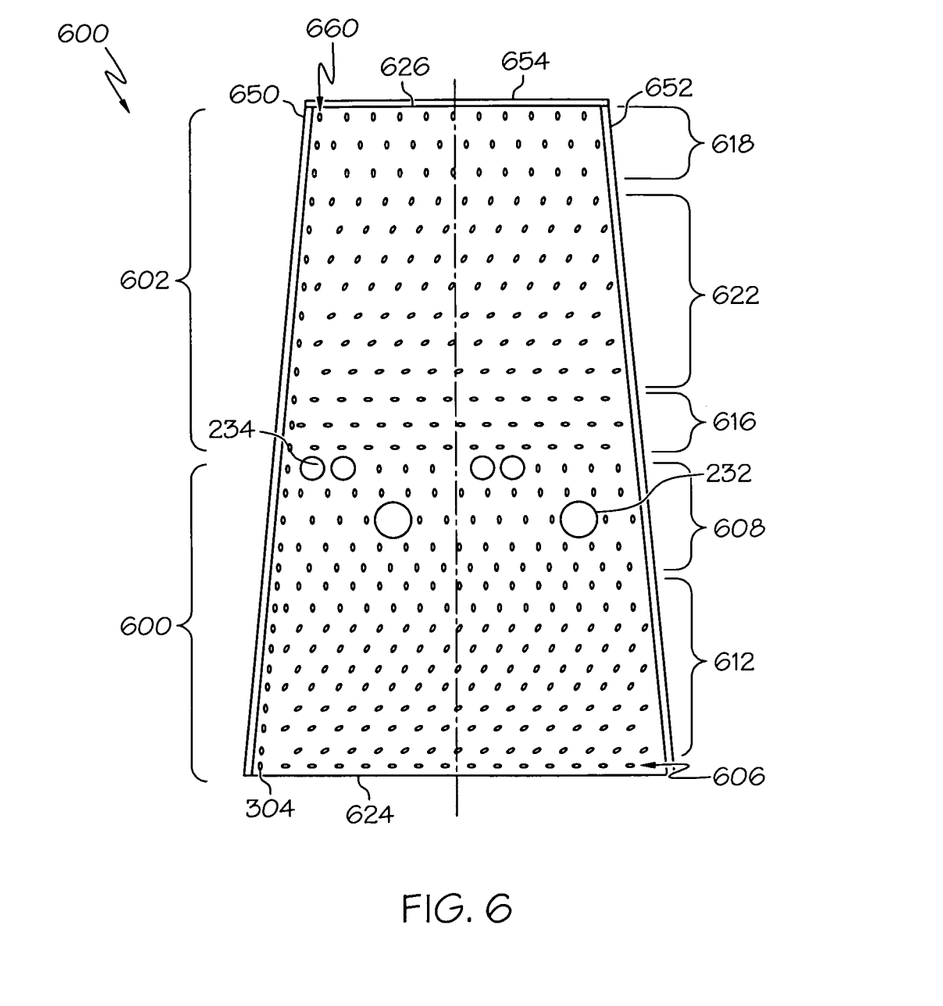
FIG. 6 is a plan view of a combustor liner section that may be used in the combustor shown in FIG. 2 in accordance with an alternate exemplary embodiment.

FIG. 6 is a plan view of a combustor liner section 600 that may be used in the combustor shown in FIG. 2 in accordance with an alternate exemplary embodiment. As compared to the continuous inner and outer liners 202, 204 discussed above, the combustor 124 may have liners that are sectioned. For example, the hot wall of the inner and/or outer liner may be constructed of a plurality of adjacent liner sections. One such liner section (or heat shield) 600 is shown in FIG. 6. Each liner section 600 may include radially raised rails or edges 650, 652 that extend between an upstream end 624 and a downstream end 626. A raised rail or edge 654 may also be provided at the downstream end 626. In general, the liner section 600 has effusion cooling holes 304 that are generally the same configuration as the view in FIG. 3. As such, the liner section 600 has effusion cooling holes 304 arranged in first and second effusion cooling hole sets 600, 602 corresponding to the effusion cooling hole sets 300, 302, including an initial row 606, 616 with effusion cooling holes 304 typically disposed at a tangential angle ($\alpha_T$) of between about 70° and about 90°, a final row 608, 618 is typically disposed at a tangential angle ($\alpha_T$) of between about 0° and about 20°, and interposed rows 612, 622 are typically disposed at a tangential angle ($\alpha_T$) that is less than the tangential angle ($\alpha_T$) of the initial row 606, 616 and greater than the tangential angle ($\alpha_T$) of each final row 608, 618.

An additional row 660 of effusion cooling holes 304 may be arranged in an axial direction. The additional row 660 of effusion cooling holes 304 provides cooling air flow to the rail 650. Although the additional row 660 is adjacent to rail 650, another additional row 660 may be arranged adjacent to the rail 652. In this exemplary embodiment, the effusion cooling holes 304 of the additional row 660 are disposed at a tangential angle of between about 70° and about 90°. In the depicted embodiment, the effusion cooling holes 304 of the additional row 660 are disposed at 90° relative to an axial direction, i.e., parallel to rail 650, although other angles are possible.

As compared to a single wall combustor, a dual wall combustor has more challenging cooling requirements. For example, in a dual wall combustor, the respective walls and other components may move relative to one another during operation, and as a result, different parts of the combustor may experience different amounts of thermal growth, stress and strain. The impingement-effusion cooling configuration described herein sufficiently cool the combustion chamber to accommodate, prevent or decrease thermal growth, stress and strain. In some embodiments, this is accomplished without additional cooling augmentation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine combustor, comprising:
an inner liner having an upstream end and a downstream end, the inner liner extending in an axial direction between the upstream and downstream ends;
a dual wall outer liner having a hot wall, a cold wall at least partially surrounding the hot wall, an upstream end, and a downstream end, the outer liner extending in the axial direction between the upstream and downstream ends, the outer liner being spaced apart from, and at least partially surrounding, the inner liner;
a dome assembly coupled between the upstream ends of the inner and outer liners to define a combustion chamber between the inner liner and the hot wall of the outer liner;
a plurality of rows of effusion cooling holes disposed in the hot wall, including a first row of effusion cooling holes disposed at a tangential angle of between about 70° and about 90° relative to the axial direction and a second row of effusion cooling holes disposed at a tangential angle of between about 0° and about 20° relative to the axial direction; and
at least one row of dilution openings extending through the hot wall, the dilution opening being generally aligned in a circumferential direction with the second row of the effusion cooling holes.

2. The gas turbine engine combustor of claim 1, wherein the second row of effusion cooling holes is downstream of the first row of the effusion cooling holes.

3. The gas turbine engine combustor of claim 2, wherein the plurality of effusion cooling holes further includes a third row of effusion cooling holes axially between the first and second rows and disposed at a tangential angle, relative to the axial direction, that is less than the tangential angle of the first row of effusion cooling holes and greater than the tangential angle of the second row of effusion cooling holes.

4. The gas turbine engine combustor of claim 1, wherein the first row of effusion cooling holes is generally at the upstream end of the hot wall, and the plurality of rows of effusion cooling holes further comprises a third row of effusion cooling holes generally immediately downstream of the at least one row of dilution openings, the third row of effusion cooling holes disposed at a tangential angle of between about 70° and about 90° relative to the axial direction.

5. The gas turbine engine combustor of claim 1, wherein the first and second rows of effusion cooling holes form a first set of effusion cooling holes, and the plurality of rows of effusion cooling holes includes a second set of effusion cooling holes downstream of the first set of effusion cooling holes, the second set of effusion cooling holes including a third row of effusion cooling holes disposed at a tangential angle of between about 70° and about 90° relative to the axial direction and a fourth row of effusion cooling holes disposed at a tangential angle of between about 0° and about 20° relative to the axial direction.

6. The gas turbine engine combustor of claim 5, wherein the at least one row of dilution openings extends through the hot wall immediately upstream of the second set of effusion cooling holes.

7. The gas turbine engine combustor of claim 6, wherein the at least one row of dilution openings includes a row of primary dilution openings and a row of secondary dilution openings disposed downstream the primary dilution openings.

8. The gas turbine engine combustor of claim 1, wherein each effusion cooling hole in the first and second rows of effusion cooling holes has a diameter between about 0.01 inches and 0.03 inches.

9. The gas turbine engine combustor of claim 1, wherein each effusion cooling hole in the first and second rows of effusion cooling holes extends through the hot wall at an acute angle.

10. The gas turbine engine combustor of claim 1, further comprising a plurality of impingement openings in the cold wall of the outer liner.

11. The gas turbine engine combustor of claim 10, wherein the impingement openings extend through the cold wall at an angle of approximately 90°.

12. The gas turbine engine combustor of claim 1, wherein the hot wall of the outer liner is a first hot wall and the cold wall of the outer liner is a first cold wall, and
wherein the inner liner is a dual wall liner with a second hot wall and a second cold wall, and
wherein the plurality of rows of effusion cooling holes include a third row of effusion cooling holes disposed in the second hot wall and a fourth row of effusion cooling holes disposed in the second hot wall downstream of the third row of effusion cooling holes, the third row of effusion cooling holes disposed at a tangential angle of between about 70° and about 90° relative to the axial direction and the fourth row of effusion cooling holes disposed at a tangential angle of between about 0° and about 20° relative to the axial direction.

13. The gas turbine engine combustor of claim 1, wherein the at least one row of dilution openings is intermixed with the second row of effusion cooling holes in the circumferential direction.

14. A combustor liner segment, comprising:
a hot side;
a cold side opposing the hot side and having an upstream end and a downstream end, the cold side extending in an axial direction between the upstream and downstream ends;
a plurality of effusion cooling holes extending from the cold side to the hot side, including a first row of effusion cooling holes disposed at a tangential angle of between about 70° and about 90° relative to the axial direction and a second row of effusion cooling holes disposed at a tangential angle of between about 0° and about 20° relative to the axial direction; and
at least one row of dilution openings extending between the hot and cold sides, the dilution opening being generally aligned in a circumferential direction with the second row of the effusion cooling holes.

15. The combustor liner segment of claim 14, wherein the cold side has first and second raised edges extending in an axial direction between the upstream and downstream ends.

16. The combustor liner segment of claim 15, further comprising a third row of effusion cooling holes adjacent to the first rail and extending in an axial direction.

17. The combustor liner segment of claim 16, wherein the third row of effusion cooling holes are disposed at a tangential angle of between about 70° and about 90° relative to the axial direction.

18. The combustor liner segment of claim 14, wherein the plurality of effusion cooling holes further include a third row of effusion cooling holes disposed at a tangential angle, relative to the axial direction, that is less than the tangential angle of the first row effusion cooling holes and greater than the tangential angle of the second row of effusion cooling holes.

19. A combustor liner segment, comprising:
   a hot side;
   a cold side opposing the hot side and having an upstream end and a downstream end, the cold side extending in an axial direction between the upstream and downstream ends, the cold side having at least one raised edge extending in an axial direction between the upstream and downstream ends; and
   a plurality of effusion cooling holes extending from the cold side to the hot side, including
      a first row of effusion cooling holes extending in a circumferential direction and disposed at a tangential angle of between about 70° and about 90° relative to the axial direction,
      a second row of effusion cooling holes extending in a circumferential direction, downstream of the first row, and disposed at a tangential angle of between about 0° and about 20° relative to the axial direction,
      a third row of effusion cooling holes extending in a circumferential direction, downstream of the second row, and disposed at a tangential angle of between about 70° and about 90° relative to the axial direction,
      a fourth row of effusion cooling holes extending in a circumferential direction, downstream of the third row, and disposed at a tangential angle of between about 0° and about 20° relative to the axial direction, and
      a fifth row of effusion cooling holes adjacent to the at least one raised edge and extending in an axial direction; and
   at least one row of dilution openings extending through the hot side, the at least one row of dilution openings being generally aligned in a circumferential direction with the second row of the effusion cooling holes.

20. The combustor liner segment of claim 14, wherein the at least one row of dilution openings is intermixed with the second row of effusion cooling holes in the circumferential direction.

* * * * *